(12) United States Patent
Knittel et al.

(10) Patent No.: US 6,709,155 B2
(45) Date of Patent: Mar. 23, 2004

(54) DEVICE FOR DETERMINING THE TEMPERATURE IN THE INTERIOR OF A VEHICLE

(75) Inventors: Otto Knittel, Soest (DE); Hans-Dieter Roehling, Lippstadt (DE); Bernd Stich, Bueren (DE)

(73) Assignee: Behr-Hella Thermocontrol GmbH, Stuttgart (DE)

( * ) Notice: Subject to any disclaimer, the term of this patent is extended or adjusted under 35 U.S.C. 154(b) by 0 days.

(21) Appl. No.: 09/970,684

(22) Filed: Oct. 5, 2001

(65) Prior Publication Data

US 2002/0048308 A1 Apr. 25, 2002

(30) Foreign Application Priority Data

Oct. 6, 2000 (DE) .......................................... 100 49 979

(51) Int. Cl.[7] .............................. G01K 1/16; G01K 1/20
(52) U.S. Cl. ........................ 374/141; 374/134; 374/135; 374/165; 374/183; 236/DIG. 12; 702/130
(58) Field of Search ................................. 374/141, 165, 374/185, 183, 135, 134, 120; 702/130; 236/DIG. 12, 91 E, 91 C (56) References Cited

U.S. PATENT DOCUMENTS

| | | | | |
|---|---|---|---|---|
| 2,371,288 A | * | 3/1945 | Frownfelter | 236/DIG. 12 |
| 4,659,236 A | * | 4/1987 | Hobbs | 236/DIG. 12 |
| 4,914,924 A | * | 4/1990 | Takahashi | 236/91 C |
| 5,181,654 A | * | 1/1993 | Yoshimi et al. | 236/91 C |
| 5,340,021 A | * | 8/1994 | Kajino et al. | 236/91 C |
| 5,416,728 A | * | 5/1995 | Rudzewicz et al. | 702/130 |
| 5,996,357 A | * | 12/1999 | Park | 374/141 |
| 6,076,964 A | * | 6/2000 | Wu et al. | 374/141 |
| 6,155,492 A | | 12/2000 | Hinterwaller et al. | |

FOREIGN PATENT DOCUMENTS

| | | | |
|---|---|---|---|
| DE | 30 33 605 A1 | 3/1982 | |
| DE | 34 40 880 A1 | 5/1985 | ............ G01K/1/20 |
| DE | 37 22 000 C2 | 1/1989 | ............ G01K/1/20 |
| DE | GM 88 12 412 U1 | 1/1989 | ............ G01K/1/14 |
| DE | 41 30 063 A1 | 3/1993 | ............ G01K/1/20 |
| DE | 195 43 508 C1 | 11/1995 | |
| DE | 196 27 414 A1 | 1/1998 | |
| DE | 198 02 045 A1 | 7/1999 | |
| DE | 198 16 941 A1 | 10/1999 | ............ G01K/1/16 |
| DE | 198 42 895 A1 | 3/2000 | |
| GB | 2 084 738 A | 4/1982 | |

OTHER PUBLICATIONS

PTO 03–565, English Translation of German Patent DE 198 16 941 A1 (Oct. 1999).*
PTO 03–564, English TRanslation of German Patent DE 41 300 63 A1 (Mar. 1993).*
PTO 03–566, English Translation of German Patent (Offenlegungsschrift) DE 34 40 880 A1 (May 1985).*

* cited by examiner

*Primary Examiner*—Diego Gutierrez
*Assistant Examiner*—Stanley J. Pruchnic, Jr.
(74) *Attorney, Agent, or Firm*—Birch, Stewart, Kolasch & Birch, LLP (57) ABSTRACT

A device for determining the temperature in the interior of a vehicle includes a temperature sensor for arrangement behind a wall adjacent the interior, and a processing unit receiving the measuring signal from the temperature sensor and outputting an output signal representing the temperature in the interior of the vehicle, and a thermal conductor for sensing the temperature of the air in the interior in the region close to the wall, the thermal conductor being in thermally conductive contact with the temperature sensor and being provided to extend up to or close to the wall or through an opening in the wall.

16 Claims, 6 Drawing Sheets

DEVICE FOR DETERMINING THE TEMPERATURE IN THE INTERIOR OF A VEHICLE

FIELD OF THE INVENTION

The present invention refers to a device for determining the temperature in the interior of a vehicle.

BACKGROUND OF THE INVENTION

Vehicles equipped with air-conditioner devices have a temperature sensor for sensing the temperature in the interior of the vehicle, which sensor is hidden, for design considerations, and mostly arranged in the control of the air conditioner. For the interior temperature sensor to measure the temperature of the air in the car interior, air flows passed the interior temperature sensor that is generated by a ventilating motor also provided in the control. To this end, the interior temperature sensor is located within a channel into which the ventilating motor draws air through an opening directed towards the car interior.

This concept of determining the interior temperature by measuring techniques has basically proven useful in practice. It should be noted, however that the known systems are not error-free. For example, the system is susceptible to failure due to the presence of the ventilation motor, both with regard to the electrics and to the continuity of the airflow. If, for example, the flow resistance increases due to a clogged air-inlet opening of the channel, the interior temperature sensor is no longer sufficiently ventilated and can therefore no longer provide measuring signals representing the interior temperature with sufficient accuracy. Moreover, the interior temperature sensor can become soiled by particles entrained in the flowing air and cause inaccuracies in the measurement. This risk is particularly high in cars carrying smokers. Several attempts have been made to realize temperature measuring in the interior of a vehicle by means of a "non-ventilated" temperature sensor.

German Patent 37 22 000, for example, describes a device for measuring temperatures in the interior of a space, using two temperature sensors. While one temperature sensor is located near an inner wall defining the interior and is surrounded by the air inside the space, a second temperature sensor is situated directly on the surface of the wall. Through a differential measurement of the output signals of both temperature sensors and with consideration to a decoupling factor, the actual interior temperature is determined. Another device for measuring the interior temperature is described in German Patent 41 30 063.

From German Patent 34 40 880, a temperature measuring device for determining the air temperature in the interior of a car is known, wherein a thermal conductor element is located close to a temperature-sensitive measuring element, the thermal conductor element itself being thermally coupled with an outer wall of the car interior. In this manner, the measuring signal of the measuring element also includes the influence of the temperature of the outer wall of the car interior, adjacent to the temperature measuring device, on the air temperature.

German Patent 198 16 941 discloses a temperature measuring arrangement wherein a thermal conductor element is arranged between a measuring point and a temperature sensor.

Finally, German Utility Model 88 12412 describes a temperature measuring sensor for a cooling tower, which, in order to suppress temporary variations of the air temperature to be measured, is located with good thermally conductive connection on a support plate that also has good thermal conductivity and is subjected to the medium to be measured.

Unfortunately, the known interior temperature measuring systems with non-ventilated sensors are not developed far enough to allow for an exact determination of the interior temperature in any temperature condition the car interior and the adjacent car elements may be in.

SUMMARY OF THE INVENTION

It is the object of the present invention to provide a device for determining the interior temperature of a vehicle, with which a precise measurement or determination of the temperature can be obtained.

According to the invention, the object is solved with a device for determining the temperature in the interior of a vehicle, comprising:

- a temperature sensor for arrangement behind a wall adjacent to the interior,
- a processing unit receiving the measuring signal from the temperature sensor and outputting an output signal representing the temperature in the vehicle interior, and
- a thermal conductor element for sensing the temperature of the air of the interior within the region close to the wall, the thermal conductor element being in thermally conductive contact with the temperature sensor and is provided to extend up to or close to the wall or through an opening in the walls.

When mounting the present device in a vehicle, the temperature sensor intended to sense the temperature in the vehicle interior, is located behind a wall defining the interior. Preferably, this wall is the front bezel of the vehicle's air conditioner control. However, any other wall or surface portion of the instrument panel with integrated or added components may be used. A thermal conductor extends through an opening in the wall, the thermal conductor being thermally coupled with the temperature sensor. By the thermal conductor, the thermal conductivity from the interior to the temperature sensor is improved. As an alternative, the thermal conductor extends to or close to the (rear side of the) wall. The thermal conductor may also be an integral part of the temperature sensor (a contact end if a Surface Mount Device (SMD) temperature sensor, for example).

The solution proposed by the invention allows to reliably and exactly measure the temperature in the interior of a vehicle. According to the invention, no ventilation system is required, whereby the function of the present device is improved and its service life is extended. Finally, the present approach is also less expensive. Under aspects of comfort, the present approach is further advantageous in that acoustic nuisances such as they are experienced with the operation of a ventilation motor, for example, are eliminated.

The thermal coupling between the temperature sensor and the thermal conductor element is suitably established by a contacting of the thermal conductor element and the housing of the temperature sensor, or by a thermally conductive connection of the thermal conductor element and one of the terminal contacts of the temperature sensor. The tatter possibility is of particular interest when the temperature sensor is a SMD component. Such a component has a relative large surface provided at its terminal contact ends and contacting the conductor paths of a circuit board. Thus, the conductor path may be used to thermally couple the temperature sensor and the thermal conductor element by also contacting the latter with the conductor path. The thermally conductive connection between the thermal conductor element and the temperature sensor is the better, the closer the contact points of the respective terminal contact end of the temperature sensor and the conductor path and of the thermal conductor element and the conductor path are arranged on the same.

Suitably, the thermal conductor element comprises a metal material or, more generally, a material with good thermal conductivity. For optical reasons, it may be advantageous to provide the thermal conductor element with a coating or to otherwise design it such that its surface possibly visible from the interior of the vehicle is similar or at least adapted to the wall behind which it is arranged or through which it extends.

In order to minimize the thermal influences of components, vehicle parts and the like provided in the vicinity of the temperature sensor, it is advantageous to enclose the temperature sensor, possibly together with the circuit board on which it is provided, with a thermal shield element formed from a thermally insulating material. The material used may be foamed plastics, for example, with open-cell foamed plastics being the material of choice.

In order to further minimize temperature influences from the environment of the temperature sensor, it is suitable to compensate for the temperature influence caused by irradiation of sunlight on a neighboring component or part. According to an advantageous development of the invention, this is realized by a first solar sensor that may be arranged in an opening in the wall and which is electrically connected with the processing unit. Thus, the processing unit receives the output signal from the solar sensor and uses the same to correct the sun-related influence of the heating of the wall around the wall opening in the measuring signal provided by the temperature sensor.

In particular, the first solar sensor is a solar sensor with which both the intensity and the angle of incidence of the solar radiation can be determined. This increases the exactness of the correction of the measuring signal from the temperature sensor.

Alternatively or in addition to a previously described solar sensor, the angle of incidence and the intensity can also be determined by another solar sensor generally located in the instrument panel of the vehicle and used mainly to control the vehicle's air conditioner. From the output signal of this solar sensor, together with the output signal from the first solar sensor, the intensity and the angle of incidence of the sunlight in the region around the wall opening can be determined.

Depending on the position of the temperature sensor on the surface to be measured, the surface can be subject to more sunlight in the area of the temperature sensor when the sunlight impinges obliquely thereon than the solar sensor can detect. This is particularly true when, due to local conditions, the surface to be measured protrudes in the area of the temperature sensor and the solar sensor is provided in the part of the surface receding with respect to the projection. In this case, oblique irradiation by sunlight will impinge on the lateral faces of the projection under a different angle than determinable by the solar sensor. In this respect, one may employ the solar sensor arrangement usually present on the instrument panel when air conditioning is installed, which arrangement also measures the intensity of the sunlight. Assuming that all solar sensors are subject to the same solar radiation, a difference between the measuring signals from the solar sensor at the surface and the solar sensor on the instrument panel represents the angle of incidence of the solar radiation on the surface. From this, it may be concluded how much the projection of the surface, whose geometry and position relative to the solar sensor are known, is heated by solar radiation.

To compensate for thermal influences resulting from adjacent vehicle parts, it is advantageous to provide another temperature sensor that measures these thermal influences. In addition or as an alternative, these thermal influences can also be determined from calculation models or operation parameters of the adjacent vehicle components or parts. From these operation parameters, one may calculate an inherent heating. The sources of such inherent heating are, in particular, light sources in the vehicle component for back-lighting the front bezel, a display or the like. Taking the operation voltage of these possibly dimmable back-lights, one may draw conclusions as to the inherent heating to be expected.

Generally, a solar sensor, as described before, can be dispensed with, if the arrangement of the thermal conductor element projecting into the interior of the vehicle can be made such that the thermal conductor element is at least not subjected to direct solar radiation. It could be mounted, for example, in the foot area of the interior. However, it is preferred to position the device for determining the temperature in the interior of the vehicle in the upper and front part of the instrument panel. Here, a solar sensor should also be provided for correcting thermal influences on th temperature sensor due to solar radiation, as described before.

Such a solar sensor will project at least slightly beyond the front bezel of the control of the vehicle's air conditioner, for example. The thermal conductor may now advantageously be arranged at the housing of the solar sensor. Thus, the thermal conductor may be provided in a region of the photo-sensitive outer surface of the solar sensor that cannot optically be detected by the passengers. This may be, for example, the part of the outer surface of the solar sensor that faces toward the vehicle floor. The thermal conductor could be arranged even less conspicuously when embedded or integrated into the outer surface of the solar sensor.

The solar sensor itself has electric terminal elements suitably connected to the conductor paths of a circuit board on which the temperature sensor is also provided. Advantageously, the thermal conductor element, one of the two terminal elements of the temperature sensor and one of the two contact elements of the solar sensor are contacted (e.g., by soldering), closely together, to a common conductor path. Thus, besides the actual thermal conductor element, one may also employ the electrode of the solar sensor connected to the relative terminal element of the solar sensor for assisting thermal conduction from the vehicle interior to the temperature sensor. This electrode extends through the (plastics) mass forming the housing of the solar sensor and is, thus, in a way, thermally decoupled from the interior. However, the distance from the electrode to the outer surface of the solar sensor is small so that the thermal decoupling has no excessive effect. In any case, employing the electrode of the solar sensor improves heat transfer from the interior of the vehicle to the temperature sensor, resulting in an increased precision of the temperature measurement.

In an advantageous development of the invention, it is provided that the processing unit comprises a differentiating member with a time constant for long-time differentiation of the measuring signal of the temperature sensor. The constant or, advantageously, variable time constant of the differential member preferably ranges from several minutes to several 10 minutes (e.g. 10 to 30 minutes) and, in particular, between 2 minutes and 15 minutes. According to the invention, the measuring signal of the temperature sensor and the differentiated measuring signal, i.e. the output signal of the differentiating member, are added in the processing unit. The sum of the two signals represents the temperature within the car interior. Thereby, the thermal inertia of components or the like surrounding the temperature sensor can be compensated. Instead of differentiating the output signal of the temperature sensor, the difference between the set and the actual values of the interior temperature can be subjected to differentiation. Therefore, the term "processing unit" as used in this specification is also meant to include the interior temperature control of a vehicle air conditioner. Thus, "measuring signal of the temperature sensor" also includes the deviation in the control circuit.

In an advantageous embodiment of the invention, the processing unit includes, in addition to the differentiating member, an amplification member with an amplification factor. This amplification member amplifies the differentiated measuring signal, i.e. the output signal of the differentiating member. Suitably, the time constant of the differentiating member and/or the amoplification factor of the amplification member are kept constant or varied. The variation is effected, in particular, in dependence on the possibly compensated measuring signal from the temperature sensor itself, the time laidup and/or the environmental temperature of the vehicle, the difference between the actual and the set values of the temperature in the car interior or between the actual and the set values of the temperature of the air flowing into the vehicle interior and/or the temperature of the coolant water.

Thus, the present invention suggests to sense the temperature in the interior of a vehicle by means of a temperature sensor arranged behind a surface or a wall defining the interior of the vehicle. The thermal conductor element increases the amount of heat transferred between the interior and the temperature sensor. Further, (parasitic) heat transfer is effected by inherent heating or a heating due to solar radiation on the surface or the wall behind which the temperature sensor is arranged or due to adjacent parts or vehicle components. Thus, the temperature sensor should be arranged in a suitable holder with small contact surfaces such that it receives and gives off only a minimum of heat from or to the adjacent vehicle parts, components or the like by thermal conduction. To minimize influences acting through thermal conduction through the air, it is feasible to provide a thermal shield element around the temperature sensor. To minimize thermal transfer via components (circuit boards, etc.) in contact with the temperature sensor, it is useful to make these parts from corresponding materials of relatively poor thermal conductivity. For example, the contact paths (conductor paths) leading to the temperature sensor could be made narrow and thin so as to realize a thermal decoupling between the temperature sensor and the electronics connected as well as the vicinity of the temperature sensor.

The thermal conductor element may also be provided behind a projection, e.g. at the rear thereof, of the wall delimiting the interior. By the fact that the thermal conductor element projects toward the interior with respect to the adjacent portion of the wall, the thermal conductor element extends "through" the wall, meaning that it protrudes relative to the adjacent wall portion. Further, the projection of the wall provides for a good thermal coupling between the thermal conductor element and the interior, because the surface of the projection is exposed to the interior. Moreover, there is a sufficient thermal decoupling from the wall.

In any case, the thermal conductor extends up to or close to the rear side of the wall. Possibly, the temperature sensor is provided directly at the rear side of the wall, its electric contact ends or terminals acting—depending on the respective design—as thermal conductors to improve heat transfer from the interior (front of the wall) to the temperature sensor.

Another alternative provides that the thermal conductor element or the temperature sensor is provided behind a function key or a dummy function key of a functional unit. The function key extends through an opening in the front cover of the functional unit, whereby the thermal conductor element also extends through this opening. If a dummy functional key projects as an integral part from the front cover into the interior, the situation described above is obtained.

BRIEF DESCRIPTION OF THE DRAWINGS

The following is a detailed description of an embodiment of the invention with reference to the accompanying drawings. In the figures.

DETAILED DESCRIPTION OF A PREFERRED EMBODIMENTS

Figure 1:
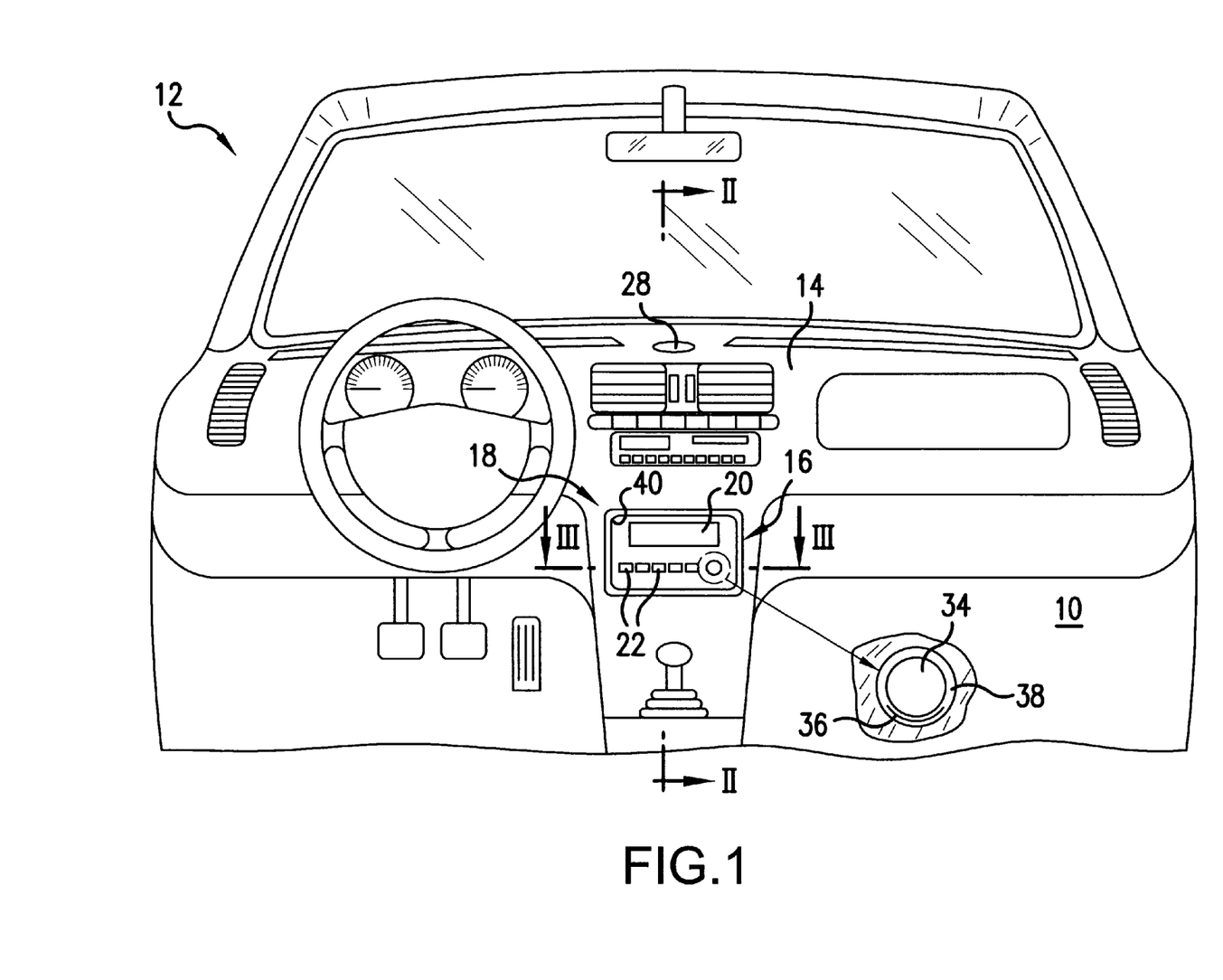
FIG. 1 is a view of the instrument panel of a vehicle with an air conditioner control, seen from the interior of the vehicle.
Figure 2:
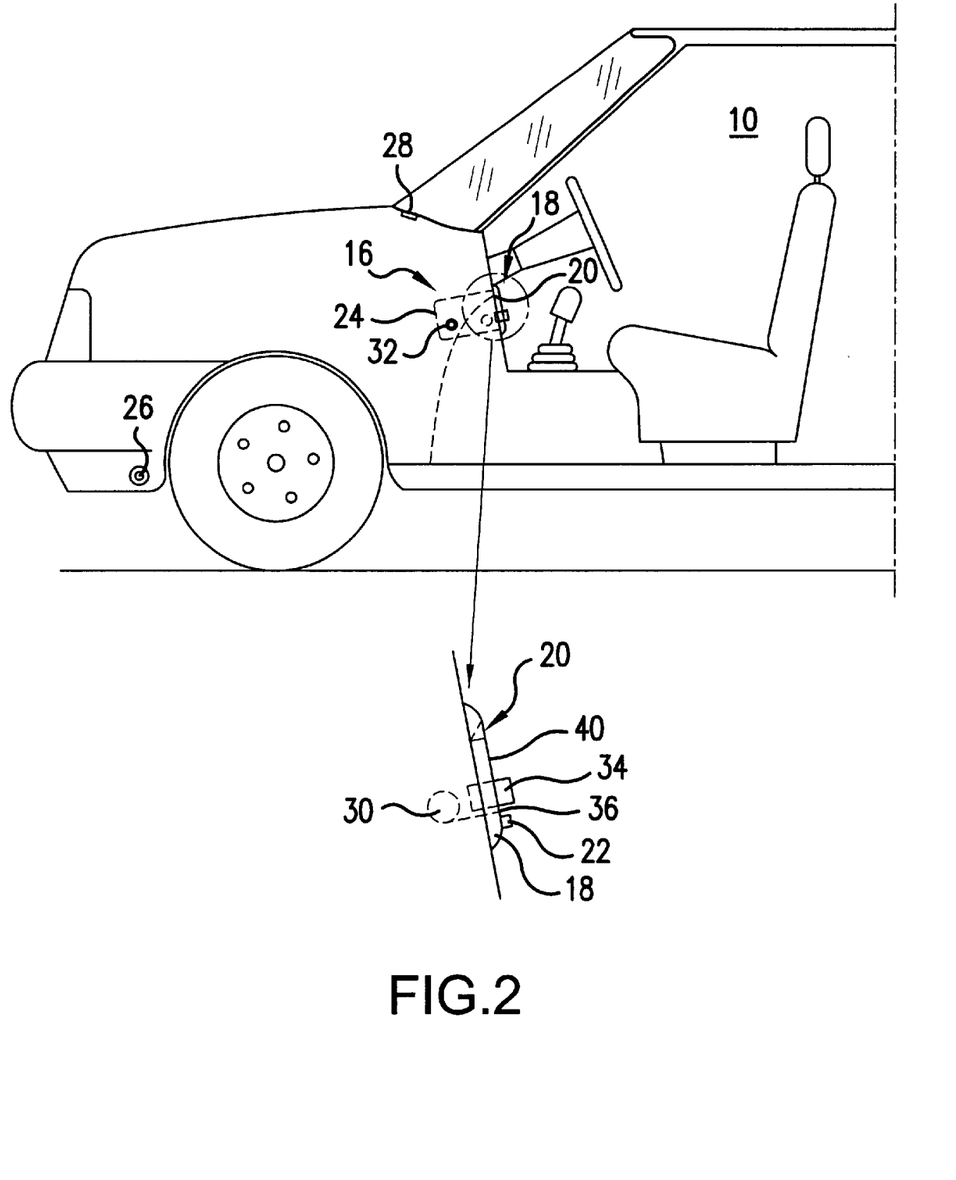
FIG. 2 is a sectional view along line II—II of FIG. 1 to illustrate the arrangement of sensors for measuring the temperature of the vehicle interior, comprising a non-ventilated sensor.

Referring now to FIG. 1, there is shown a view on the front side of an interior 10 of a vehicle 12 having an air condition (automatic air conditioner). The air conditioner control 16 is arranged in the instrument panel 14 of the vehicle 12, the control having a front bezel 18 with a display 20 and a plurality of keys 22. As illustrated in FIG. 2, the front bezel 18 closes the control 16 off against the interior 10. The control 16 has a housing 24 set into the instrument panel 14. Besides various sensors such as an outer temperature sensor 26 and solar sensors 28, the air condition of the vehicle 12 comprises a plurality of components that will not be discussed in detail, since they have no relevance for the present invention.

However, the manner of measuring the temperature in the vehicle interior 10 is of interest. To determine this interior temperature, an arrangement of sensors is provided, comprising two temperature sensors 30, 32 and a solar sensor 34 (photo diode). The first temperature sensor 30 is located behind the front bezel 18 of the control 16 and thermally connected to a thermal conductor element 36 that extends through an opening 38 in the front bezel 18 into the interior 10. Thus, the first temperature sensor 30 senses the temperature of the air in the interior 10 in front of the surface 40 formed by the front side of the front bezel 18. The second temperature sensor 32 is located within the housing 24 of the control 16 and measures the inherent heating of the control 16. Thus, the measuring signal of the first temperature sensor 30, corrupted by the inherent heating of the control 16, may be compensated for. The solar sensor 34 measures the intensity of the solar radiation impinging on the front bezel 18 so that its output signal represents the heating of the front bezel 18 due to solar radiation. This allows to compensate for the corruption in the measuring signal of the first temperature sensor 30 due to the thermal influence by the front bezel IS heated by solar radiation.

The solar sensor 34 protrudes through the opening 38 of the front bezel 18 and protrudes slightly beyond the same. By giving the housing of the solar sensor 34 the color of the front bezel 18, the solar sensor 34 is rather inconspicuous. The exact structure of the sensors arranged behind or in the front bezel 18 will be explained hereafter with reference to FIGS. 3 to 7, where FIGS. 3 to 6 illustrate a first embodiment of the sensors and FIG. 7 shows a second embodiment thereof.

Figure 3:
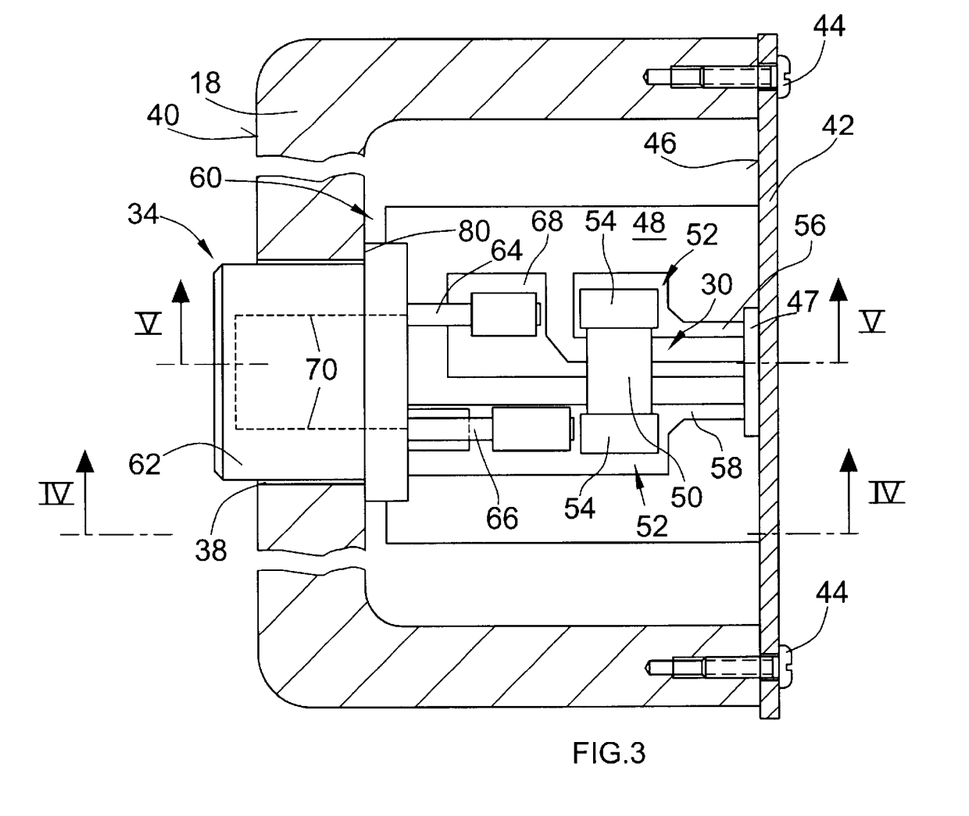
FIG. 3 is a sectional view along line III—III through the front bezel and the components of the air conditioner control therebehind, for illustration of the sensor arrangement.

As illustrated in FIG. 3, a circuit board 42 is arranged behind the front bezel 18, screwed to the front bezel 18 by screws 44. Besides a plurality of electric and electronic components, the circuit board 42 has its front 46 facing the front bezel 18 provided with a plug connector 47 for receiving a conductor card 48. The first temperature sensor 30 is provided on this conductor card 48, the sensor being designed as a SMD component (e.g. a NTC or PTC transistor) with a temperature sensitive body 50 and two terminal elements 52 formed by two terminal ends 54. The conductor card 48 further comprises two conductor paths 56, 58 extending from the plug connector 47 to the temperature sensor 30 to which the terminal ends 54 are soldered. One of the two conductor paths (the conductor path 58 in the present embodiment) is extended to the end 60 of the conductor card 48 near the front bezel 18.

The conductor card 48 is situated behind the opening 38 of the front bezel 18. The solar sensor 34 is also connected to and held at the connector card 48. To this avail, the solar sensor 34 has two terminal elements 64, 66 extending from its housing 62, of which the terminal element 66 is soldered to the conductor path 58 in immediate proximity to the terminal end 54 of the temperature sensor 30. The second terminal element 64 of the solar sensor 34 is soldered to a conductor path 68 that extends to the plug connector 47. The housing 62 of the solar sensor 34 further holds the electrodes (anode and cathode) indicated at 70.

Also mounted on the conductor path 58 is the thermal conductor element 36 that projects beyond the end 60 of the conductor card 48 and is formed as an element that partly encloses the light transmissive outer surface 72 of the solar sensor housing 62. The thermal conductor element 36 thus comprises an abutment section 74 connected to the conductor path 58 by soldering, for example, which is adjoined by an angled section 76 partly covering the solar sensor housing 62 in the portion below the conductor card 48. Extending from this section 76 is a peripheral section 78 covering a part of the outer surface 72 (also see FIGS. 5 and 6 that illustrate the previously mentioned sections of the thermal conductor element 36). In particular, FIGS. 4 to 6 show that the peripheral section 78 protrudes beyond the surface 40 formed by the front side of the front bezel 18.

It is the purpose of the thermal conductor 36 to provide for an improved heat transfer from the interior 10 of the vehicle to the temperature sensor 30. The thermal coupling of the thermal conductor 36 to the temperature sensor 30 is effected through the common contacting on the conductor path 58. Accommodating the thermal conductor 36 at the lower part of the outer surface of the sensor housing 62, facing to the floor of the interior 10, is optically advantageous. As is particularly well seen in FIGS. 4 to 6, the section 78 of the thermal conductor 36, enclosing the sensor housing 62 like a shell, is set into the outer surface 72 of the housing 62 of the solar sensor 34.

Figure 4:
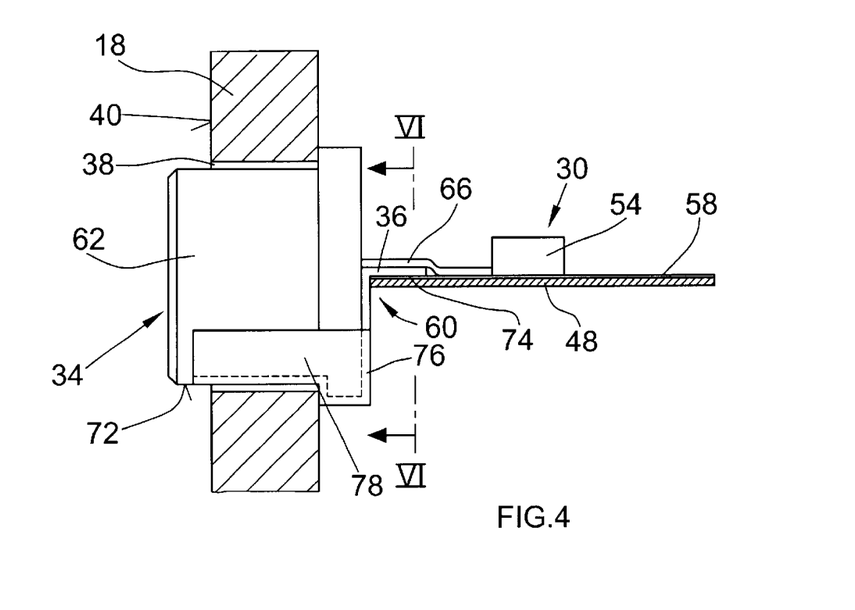
FIG. 4 is a sectional view along line IV—IV in FIG. 3.
Figure 5:
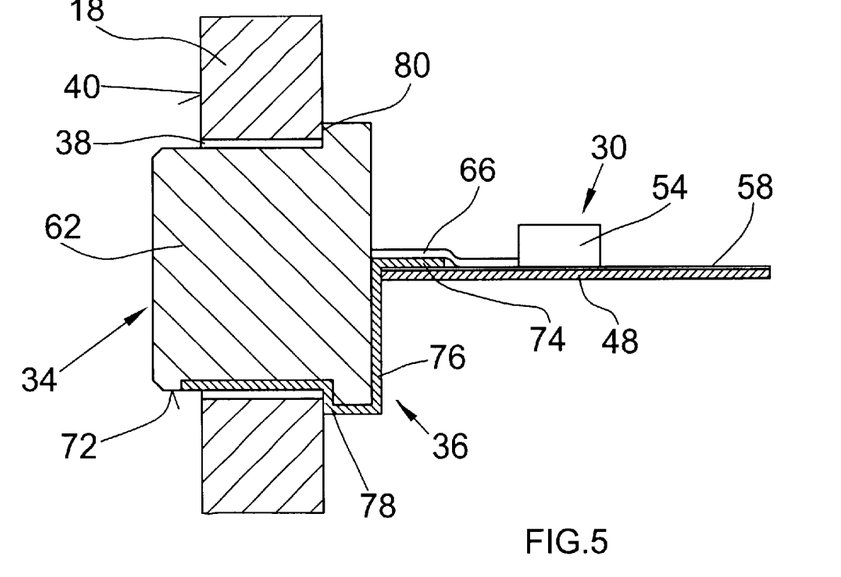
FIG. 5 is a sectional view along line V—V in FIG. 3.
Figure 6:
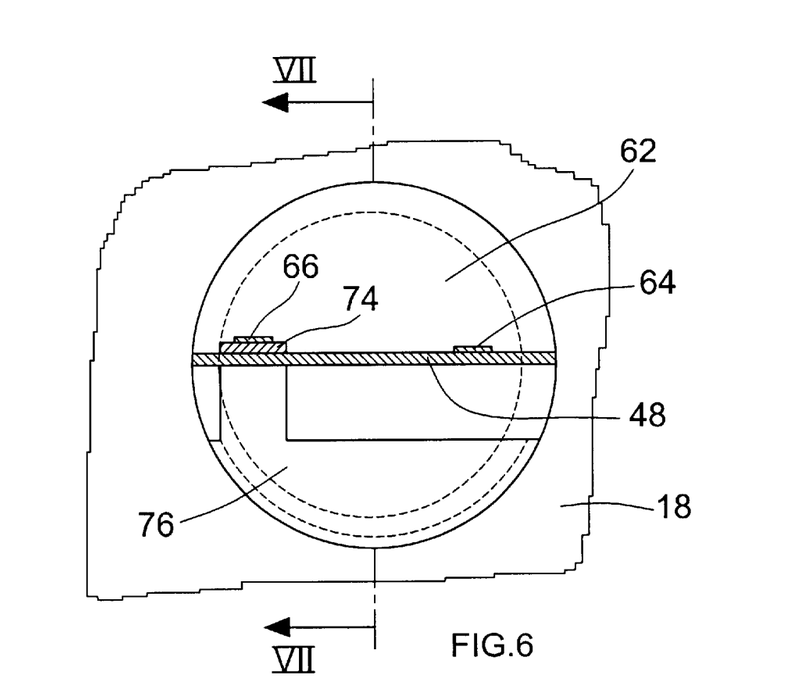
FIG. 6 is a sectional view along line VI—VI in FIG. 3.
Figure 7:
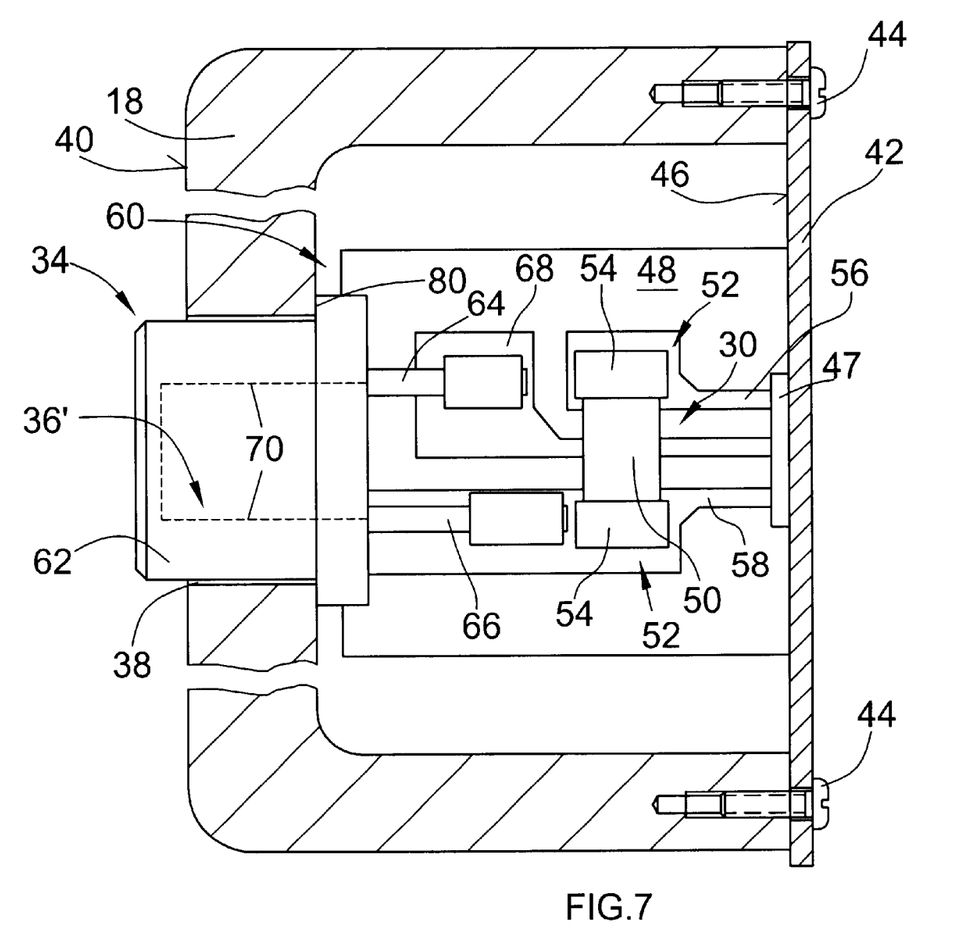
FIG. 7 is a sectional view similar to that of FIG. 3, but in an alternative embodiment of the present device.

To prevent light from escaping from the control 16 through the gap between the front bezel opening 38 and the solar sensor 34, the same has a shoulder 80 with which the housing 62 abuts the front bezel 18 from inside (see FIGS. 4 to 6).

For further thermal insulation of the temperature sensor 30 from its environment so as to reduce thermal influences on the temperature sensor 30, the same or the conductor card 48, respectively, have at least their top surface with the temperature sensor 30 thereon enclosed or covered by a thermally insulating material acting as a shield. For clarity, this material—preferably open-celled foamed plastics—is not illustrated.

As already mentioned before, FIG. 7 illustrates an alternative embodiment of a thermal conductor element 36'. In as far as the elements illustrated in FIG. 7 correspond to those in FIGS. 3 to 6, they have been accorded the same reference numerals.

The difference between the embodiments in FIGS. 3 and 7 is that the embodiment of FIG. 7 dispenses with a separate thermal conductor element. For the thermal conductor element 36' extending into the interior of the vehicle, the embodiment of FIG. 7 uses one of the two electrodes 70 embedded in the material of the housing 62 of the solar sensor 34. The heat transported via this electrode reaches the terminal end 54 of the temperature sensor 30 via the contact element 66 and the conductor path 58.

The heat transfer mechanism described above for the embodiment of FIG. 7, using the electrode of the solar sensor 34 connected to the contact element 66, of course also works in the embodiment of FIG. 3. In the embodiment of FIG. 3, this heat transfer mechanism assists the much stronger heat transfer via the separate thermal conductor element 36.

Figure 8:
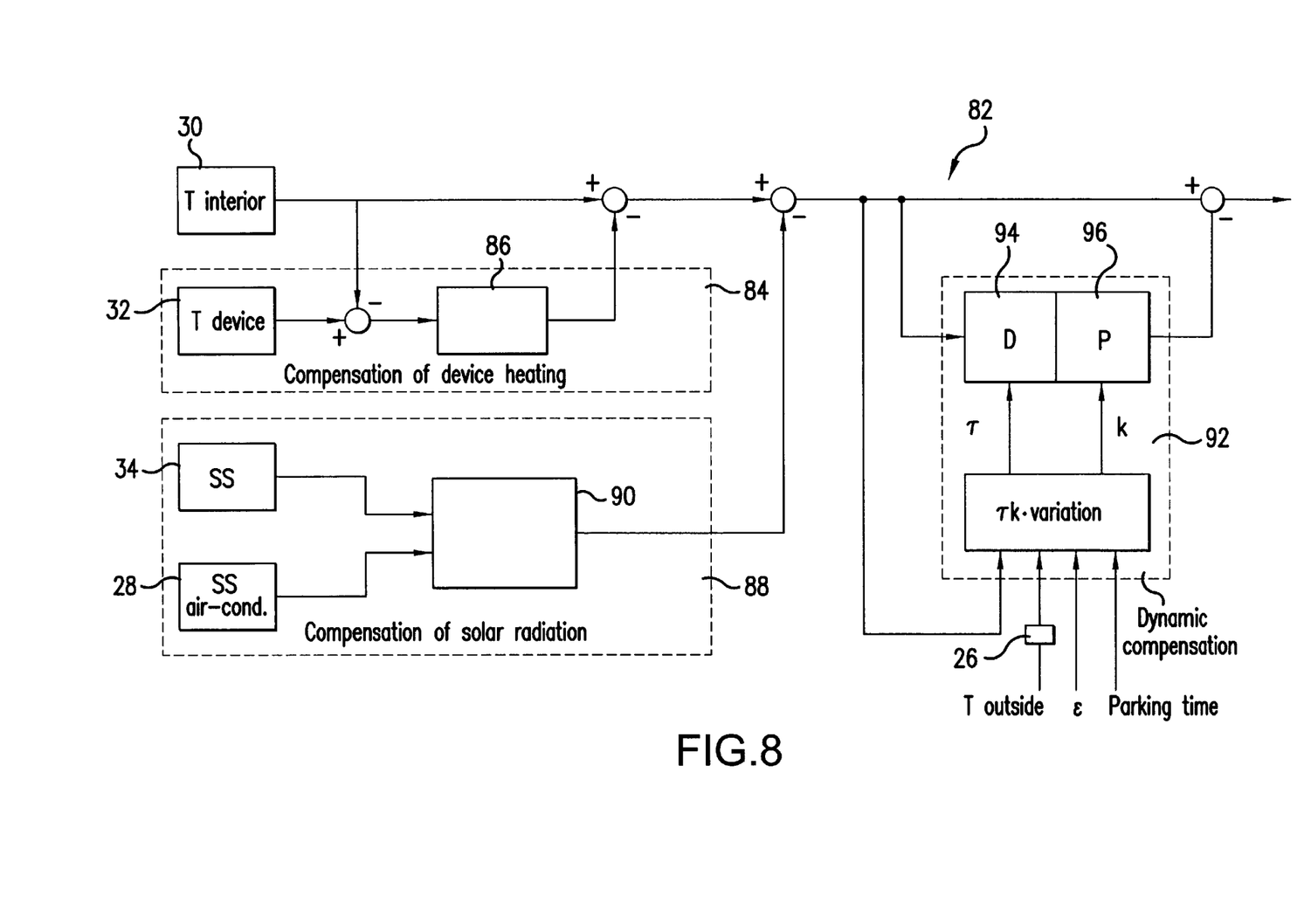
FIG. 8 is a block diagram of the circuitry of the non-ventilated temperature sensor for determining the temperature within the vehicle interior.

All measuring sensors (temperature sensors 30, 32 and solar sensors 28, 34) are interconnected as seen in FIG. 8, so as to conclude on the temperature in the interior 10 from their measuring signals. FIG. 3 illustrates the block diagram of a processing unit 82.

The measuring signal of the temperature sensor 30 located behind the front bezel is influenced by the inherent heating of the control and the heating of the front bezel 18 by solar radiation. Therefore, the circuit of FIG. 1 includes a unit 84 for compensating the device heating. In this unit, the measuring signals of the two temperature sensors 30, 32 are subtracted and the differential signal is supplied to a low pass filter 86. The output signal of the low pass filter 86 is combined with the measuring signal of the temperature sensor 30 by establishing the difference between both.

The circuit of FIG. 8 further includes a unit 88 for compensating the heating of the front bezel 18 due to solar radiation. The solar sensor 34 provided to this effect in the front bezel 18, i located immediately near the temperature sensor 30, as described before. Generally, it is sufficient to evaluate only the output signal from the solar sensor 34 located at the front bezel 18. In special cases, it may be useful to determine the angle and the intensity of the solar radiation impinging on the temperature sensor 30 by comparing the output signals from the air condition solar sensor 28 and the front bezel solar sensor 34. Thus, the heating of the front bezel 18 by solar radiation can be determined more exactly. This is particularly true when, due to spatial circumstances, solar radiation acts on the solar sensor 34 also from the side. The output signal from the front bezel temperature sensor 30 is compensated for by the output signal from the circuit component 90 for assessing the solar sensor signals from the unit 88, which may be done by subtraction.

For a possibly fast use of the measuring signal of the front bezel temperature sensor 30 in the determination of the temperature in the interior 10 also during transient temperature processes, it is required that this measuring signal is subjected to dynamic compensation, no matter if it has been compensated or not, as described before. To this end, the circuit of FIG. 8 is provided with a dynamic compensation unit 92. This unit 92 comprises a differentiating element 94 and an amplification element 96, whose time constant T and amplification factor k are variable. This variation is done in dependence on the temperature-compensated measuring signal of the temperature sensor 30, the outside temperature measured by the sensor 28, the time the vehicle has been parked and the difference ε between the set and the actual values of the temperature in the interior 10. The differentiating element 94 is a long-time differentiating element with a time constant in the range from a few minutes to several 10 minutes. By differentiating the measured or pre-compensated signal from the temperature sensor 30, erroneous measurements are compensated that are caused by the more inert temperature behavior of the other vehicle parts adjacent the interior 10, with respect to the temperature sensor and the thermal conductor element 36, 36'. The entire vehicle portion adjacent the interior 10 heats up substantially slower or cools down substantially slower than the air in the interior 10. This has to be taken into account when measuring the temperature in the interior using the temperature sensor 30 located close to the front bezel 18; the long-time differentiating element 94 is employed therefor. Using the proportional element 96 and, in particular, through variation of its amplification factor, these factors of influence on the measuring signal from the temperature sensor 30 may be weighted.

On the whole, the circuitry of FIG. 8 and, in particular, the long-time differentiation by the dynamic compensation unit 92 result in a conveniently operating device for determining the temperature inside a vehicle, without having to use a ventilated interior temperature sensor. The advantages of the present "non-ventilated" temperature sensor rest with an increase in reliability of the entire device, since electrical and mechanical failures of movable components will not occur. Further, costs are saved and an increased functional reliability as well as greater comfort are obtained, since no acoustic nuisances occur.

What is claimed is:

1. A device for determining the temperature in the interior of a vehicle, comprising:
   a temperature sensor for arrangement behind a wall adjacent the interior,
   a processing unit receiving the a measuring signal from the temperature sensor and outputting an output signal representing the temperature in the interior of the vehicle, and
   a thermal conductor for conducting the heat representing the temperature of the air in the interior in the region close to the wall, the thermal conductor being in thermally conductive contact with the temperature sensor and being provided to extend up to or close to the wall or through an opening in the wall, wherein a first solar sensor is provided for arrangement in the opening of the wall, said first solar sensor being electrically connected to the processing unit, and wherein, in the processing unit, the influence of the heating of at least the wall portion around the wall opening on the measuring signal of the temperature sensor is corrected.

2. The device of claim 1, wherein, using the first solar sensor, the intensity and the angle of incidence of the solar radiation can be determined.

3. The device of claim 1 or 2, wherein a further solar sensor is provided that senses the solar radiation the vehicle is subjected to, and wherein, from the measuring signals of both solar sensors the intensity and the angle of incidence may be determined which at least the wall portion around the first solar sensor located in the opening in the wall is exposed to.

4. The device of claim 1, wherein the first solar sensor has a photosensitive outer surface and the thermal conductor abuts the first solar sensor in a portion of the outer surface, where substantially no sunlight impinges on the first solar sensor.

5. The device of claim 4, wherein the thermal conductor is arranged within the outer contour of the first solar sensor defined by the outer surface of the first solar sensor.

6. The device of claim 1, wherein the first solar sensor has electric terminal elements and wherein one of the terminal elements of the first solar sensor is in thermally conductive contact with a terminal element of the temperature sensor.

7. The device of claim 6, wherein the one terminal element of the first solar sensor and the terminal element of the temperature sensor are also electrically interconnected.

8. A device for determining the temperature in the interior of a vehicle, comprising:
   a temperature sensor for arrangement behind a wall adjacent the interior,
   a processing unit receiving a measuring signal from the temperature sensor and outputting an output signal representing the temperature in the interior of the vehicle, and
   a thermal conductor for conducting the heat representing the temperature of the air in the interior in the region close to the wall, the thermal conductor being in thermally conductive contact with the temperature sensor and being provided to extend up to or close to the wall or through an opening in the wall, wherein, in the processing unit, the influence of the temperature of a vehicle component close to the temperature sensor is corrected.

9. The device of claim 8, wherein the vehicle component is the control of a vehicle air condition.

10. The device of claim 9, wherein the temperature of the vehicle component can be determined directly by another temperature sensor through mensuration and/or indirectly from the current operational condition of the vehicle component.

11. The device of claim 10, wherein the vehicle component has a front face back-light and/or a lit display, and wherein for an indirect determination of the temperature of the vehicle component, the control voltages for the back-light and/or the display lighting are used.

12. The device of claim 8, wherein the processing unit comprises a differentiating element with a time constant for long-term differentiation of the measuring signal of the temperature sensor, wherein the processing unit adds the measuring signal or a corrected measuring signal and a differentiated measuring signal, and wherein a sum of these two signals represents the temperature in the interior of the vehicle.

13. The device of claim 8, wherein the temperature sensor is a SMD component.

14. The device of claim 8, wherein the processing unit comprises an amplification element with an amplification factor for amplifying the measuring signal and/or a differentiated and/or corrected measuring signal of the temperature sensor.

15. The device of claim 14, wherein a second solar sensor is provided that senses the solar radiation the vehicle is subjected to, and wherein, from the measuring signals of both solar sensors the intensity and the angle of incidence may be determined which at least the wall portion around the first solar sensor located in the opening in the wall is exposed to.

16. The device of claim 14, wherein the time constant of the differentiating element and/or the amplification factor of the amplification element are selectable and/or corrigible in dependence on the measuring signal and/or the corrected measuring signal of the temperature sensor, the parking time of the vehicle, the ambient temperature of the vehicle, the deviation between the set and the actual values of the interior temperature of the vehicle, or the temperature of the air flowing into the interior of the vehicle and/or the coolant water temperature.

* * * * *